United States Patent

Ishiyama

[11] Patent Number: 5,806,019
[45] Date of Patent: Sep. 8, 1998

[54] OBJECT DETECTING PROCESS IN VEHICLE

[75] Inventor: Mahito Ishiyama, Wako, Japan

[73] Assignee: Honda Giken Kogyo Kabushiki Kaisha, Tokyo, Japan

[21] Appl. No.: 651,225

[22] Filed: May 22, 1996

[30] Foreign Application Priority Data

May 23, 1995 [JP] Japan .................................. 7-123422

[51] Int. Cl.⁶ .................................................. G01S 13/60
[52] U.S. Cl. ........................ 701/300; 701/301; 701/207; 701/96; 340/903; 340/435; 342/70
[58] Field of Search ................................ 701/300, 301, 701/302, 207, 223, 96; 340/902, 903, 435, 436; 342/70, 118, 357, 454, 455, 457

[56] References Cited

U.S. PATENT DOCUMENTS 5,291,207  3/1994  Kikuchi et al. ............................ 342/70
5,600,561  2/1997  Okamura ................................. 701/300

FOREIGN PATENT DOCUMENTS 4244184  7/1993  Germany .
5-180933  7/1993  Japan .

Primary Examiner—Tan Q. Nguyen
Attorney, Agent, or Firm—Nikaido, Marmelstein, Murray & Oram LLP

[57] ABSTRACT

In a vehicle including a distance sensor capable of detecting longitudinal and lateral distances from a subject vehicle to an object, the following steps are carried out: a step of enclosing some of the detection data, detected by the distance sensor, which exist within a first predetermined distance from one another, into a block having a block label assigned thereto, a step of comparing last and current values of the center of gravity position of each block with each other for every same block label to calculate a relative speed of each block relative to the subject vehicle, a step of determining object data by determining that some of the blocks, which exist within a second predetermined distance from one another and a difference between the relative speeds of which is within a preset value, are the same object, and a step of averaging lateral relative speeds of the blocks in the same object to determine a lateral relative speed of the object relative to the subject vehicle. In this manner, objects whose relative motions relative to the subject vehicle are different from one another are correctly detected, and lateral relative speed of the objects relative to the subject vehicle are accurately detected.

14 Claims, 11 Drawing Sheets

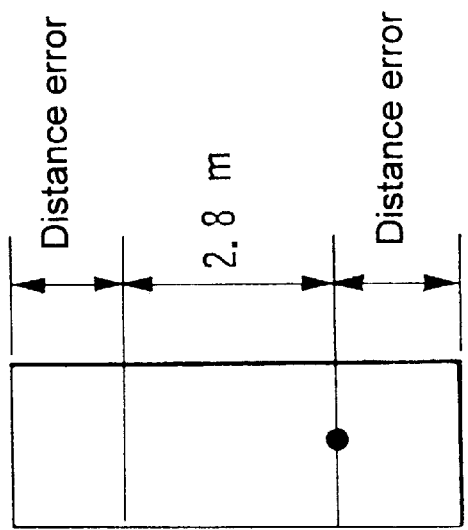
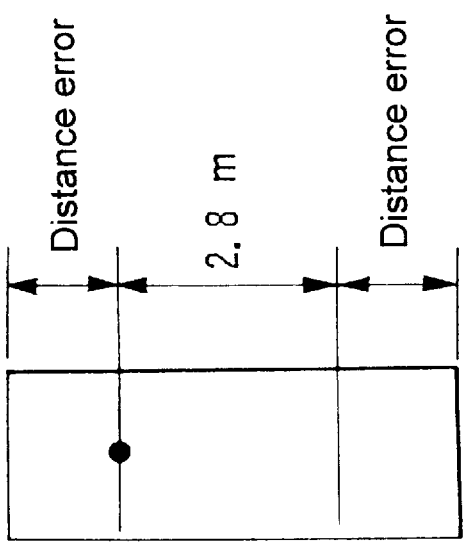
FIG.6A
FIG.6B

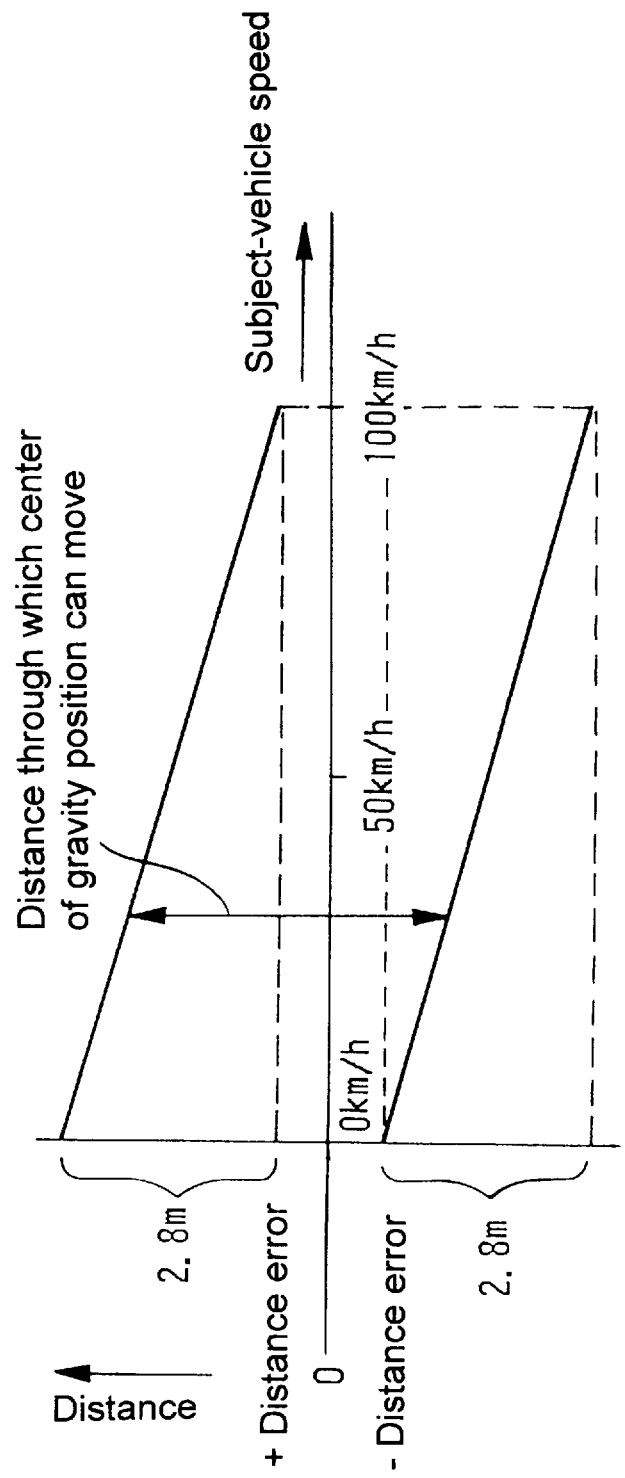

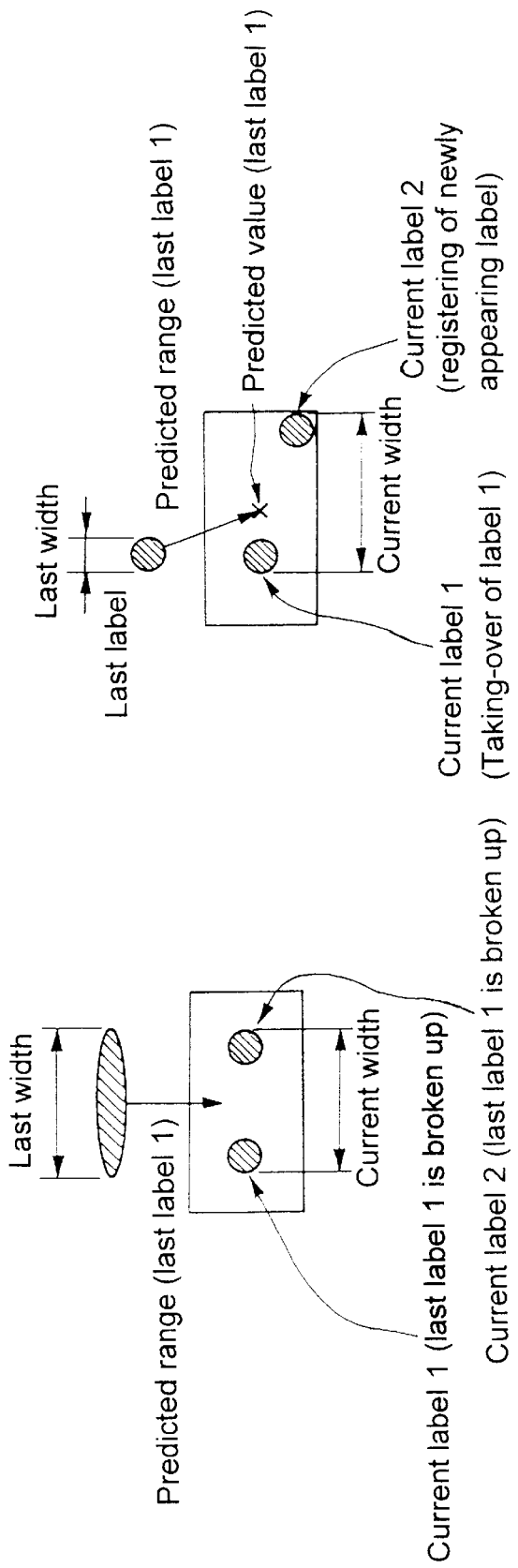

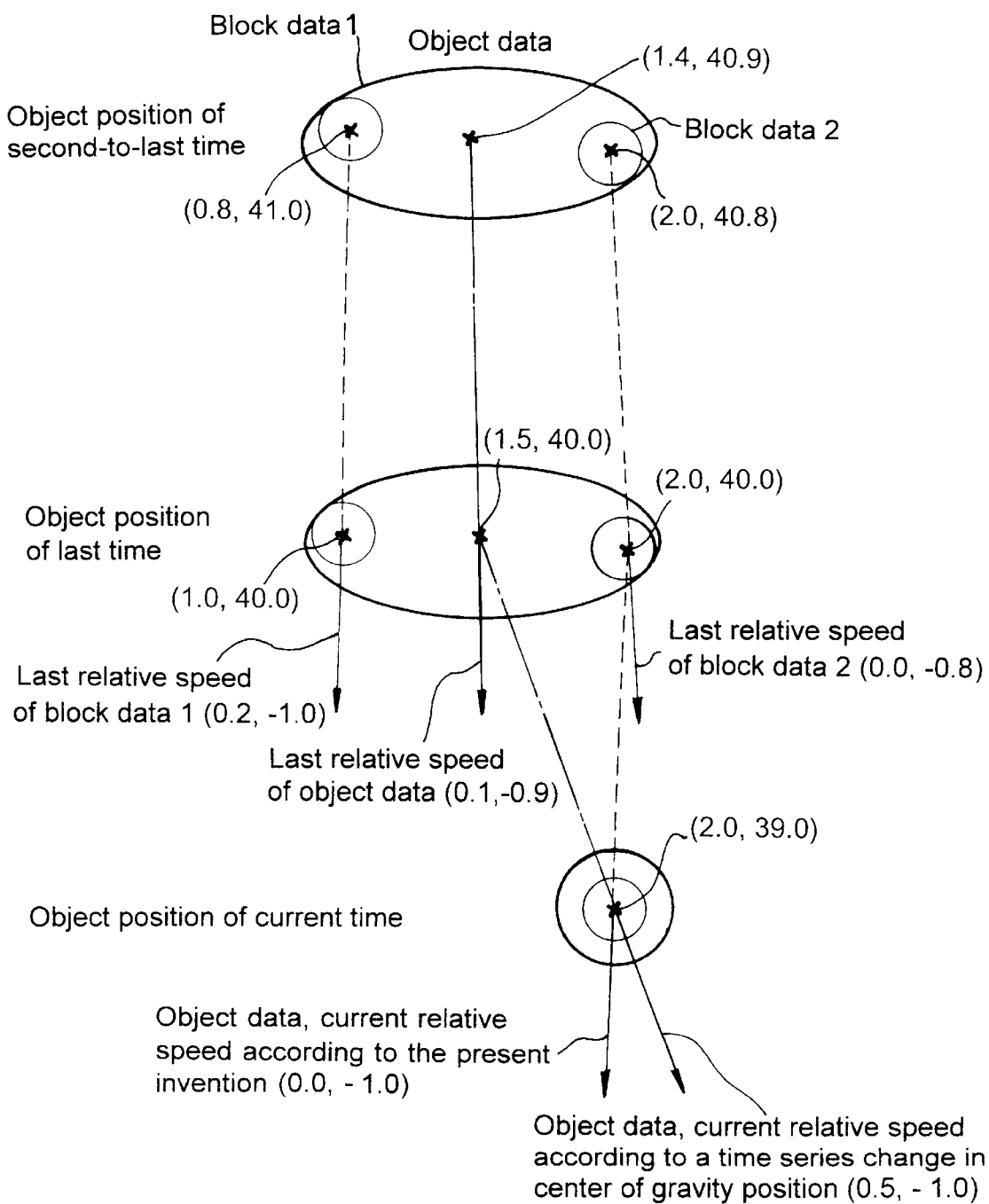

OBJECT DETECTING PROCESS IN VEHICLE

BACKGROUND OF THE INVENTION

1. Field of the Invention

The present invention relates to a process for detecting an object based on data detected by a distance detector provided in a vehicle. The distance detector detects longitudinal and lateral distances from the subject vehicle to the object by transmitting a signal to the object and receiving the reflected signal from the object.

2. Description of the Related Art

There is an object detecting process which is conventionally known, for example, from Japanese Patent Application Laid-open No. 5-180933, and which is designed to detect objects by assigning the same labels or identifiers to adjacent detection data detected by the distance sensor (or detector).

If the process for assigning the same labels to adjacent detection data is carried out, for example, when a four-wheel vehicle is traveling in proximity to a guard rail which is ahead of the subject vehicle, the four-wheel vehicle and the guard rail are recognized as the same object. Thus, it is difficult to correctly detect the objects.

SUMMARY OF THE INVENTION

Accordingly, it is an object of the present invention to provide an object detecting process in a vehicle, wherein a plurality of objects whose relative motions, which are relative to the subject vehicle and which are different from each other, can be correctly detected, and the lateral relative speeds of the objects, relative to the subject vehicle, can be accurately detected.

Accordingly to the invention, there is provided process for detecting an object in a vehicle which includes a distance sensor. The distance sensor is capable of detecting longitudinal and lateral distances from the subject vehicle to an object by transmitting a signal to the object and receiving a reflected signal from the object. The process includes an enclosing step for enclosing, into a block having a block label assigned thereto, some of detection data detected by the distance sensor which exist within a first predetermined distance from one another. Next, last and current values of the center of gravity position of each block are compared with each other for every same block label to calculate a relative speed of each block relative to the subject vehicle. Object data is determined by determining that some of the blocks which exist within a second predetermined distance and a difference between the relative speeds of which is within a present value, are the same object. Finally, lateral relative speeds of the blocks in the same object are averaged to provide a lateral relative speed of the object relative to the subject vehicle.

With such a detecting process, by enclosing into blocks some of the detection data detected by the distance sensor which exist within a first predetermined distance from one another, variations in distance between the object and the subject vehicle and variations in state of the object are absorbed to stably provide object data. In addition, objects whose relative motions relative to the subject vehicle are different, can be correctly discriminated by grouping the blocks based on the relative speed of each of the blocks relative to the subject vehicle and the distance between the blocks. Moreover, the lateral relative speed of the object relative to the subject vehicle is defined as an average value of the lateral relative speeds of each blocks for the same object. Hence, even if block data are not stably obtained, it is possible to prevent the lateral relative speed of an object from being varied.

The above and other objects, features and advantages of the invention will become apparent from the following detailed description of a preferred embodiment taken in conjunction with the accompanying drawings.

BRIEF DESCRIPTION OF THE DRAWINGS

FIGS. 6A to 6C are diagrams for explaining a method for determining a range in which the center of gravity position of a block is movable in a measuring period, based on newly appearing data;

FIGS. 8A to 8B are diagrams for explaining how to enclose the data into blocks when a plurality of current data exist within the predicted range of movements;

FIG. 10 is a diagram illustrating one example of the change in object data.

DETAILED DESCRIPTION OF THE PREFERRED EMBODIMENT

The present invention will now be described by way of a preferred embodiment with reference to the accompanying drawings.

Figure 1:
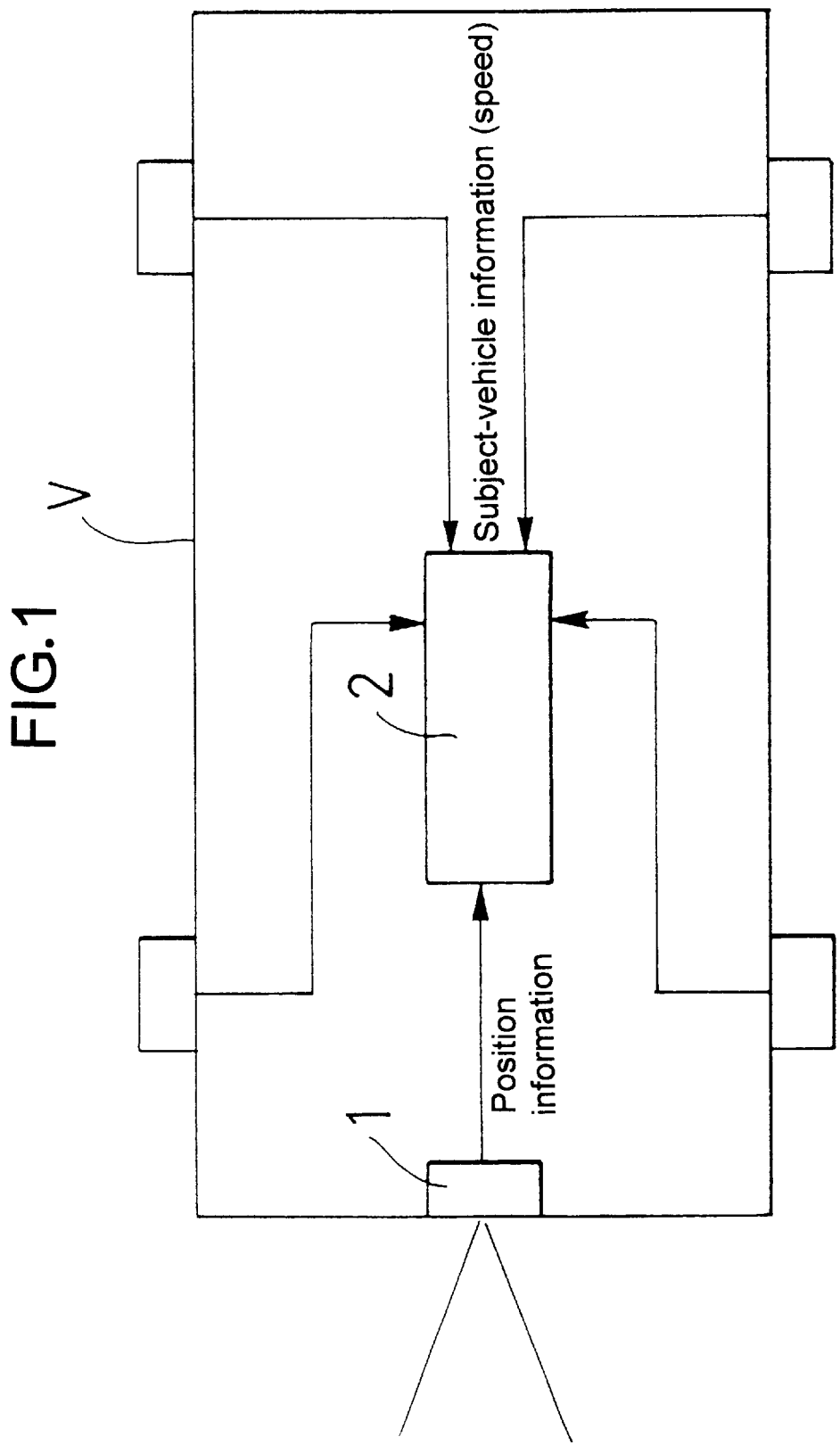
FIG. 1 is a diagrammatic illustration of the arrangement of an object detecting system.

Referring first to FIG. 1, a distance sensor 1 is mounted at a front portion of a vehicle V and is capable of detecting longitudinal (Y-axial) and lateral (X-axial) distances from the subject vehicle to an object existing ahead of the subject vehicle by transmitting a signal toward the object and receiving the reflected signal from the object. A radar of multi-beam type, a scanning beam type or the like may be used as the distance sensor 1.

Detection data, detected by the distance sensor 1, are input to an object detector 2, and subject-vehicle information such as a travel speed is input to the object detector 2. A result of detection of the object by the object detector 2 is applied to a vehicle-to-vehicle distance warning device, a collision-preventing/damage-reducing device and an automatic follow-up device and the like.

Figure 2:
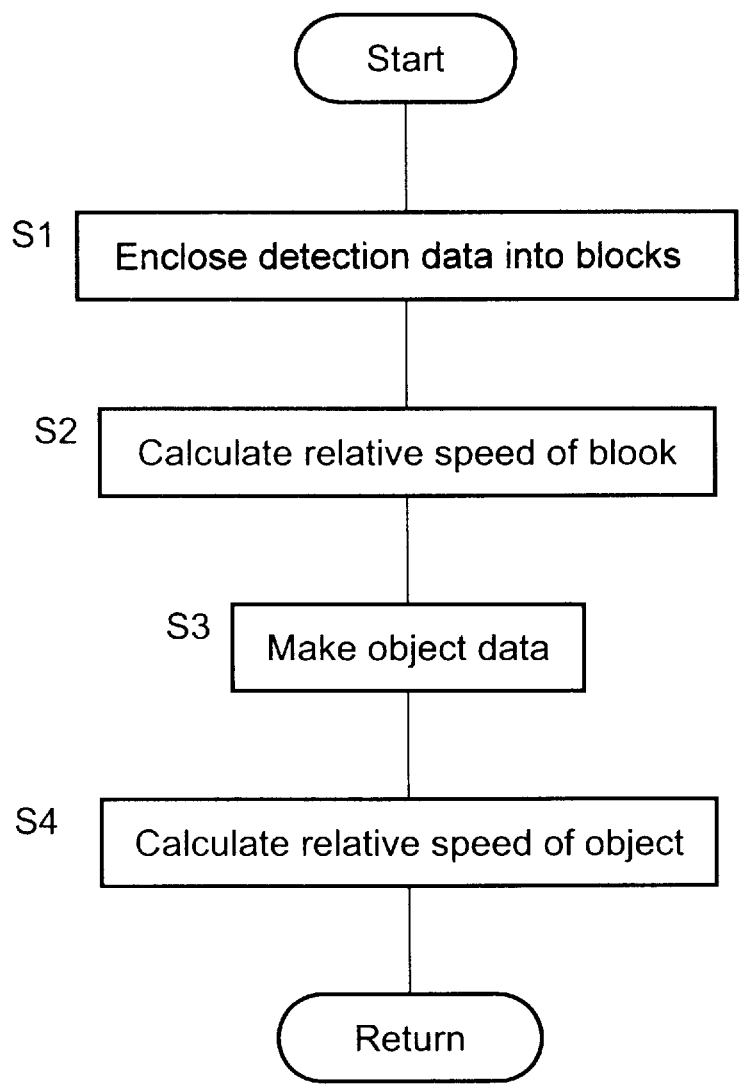
FIG. 2 is a flowchart illustrating a procedure for detecting the object.

In the object detector 2, the detection of an object is carried out by a procedure as shown in FIG. 2 based on the detection data detected by the distance sensor 1 and the subject-vehicle information.

Figure 3:
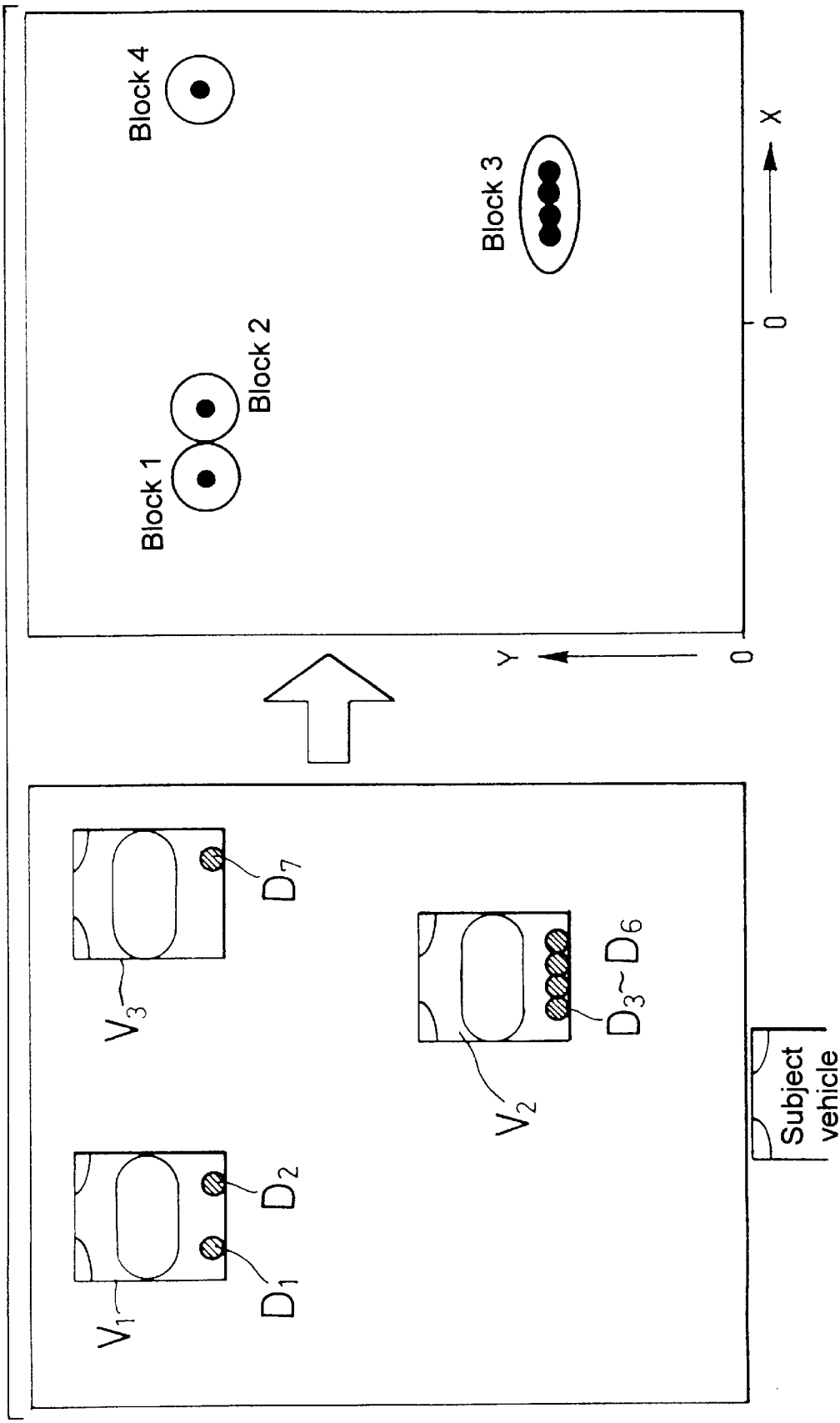
FIG. 3 is a diagram for explaining how to enclose the data into blocks.

First, at step S1, an enclosing process is carried out for enclosing a plurality of detection data obtained in the distance sensor 1 into blocks having block labels or identifiers assigned thereto. More specifically, among the current detection data detected by the distance sensor 1, those which exist within a first predetermined distance are collected into a block having a block label assigned thereto. Here, the first predetermined distance is set, for example, as a value obtained by adding an error of detection by the distance sensor 1 to the size of a reflector mounted to the actual vehicle. In a condition in which there are three vehicles $V_1$, $V_2$ and $V_3$ traveling ahead of the subject vehicle as shown at the left side in FIG. 3, when two data $D_1$ and $D_2$ having a distance between each other which is equal to or larger than the first predetermined distance are obtained from the vehicle $V_1$, and four data $D_3$, $D_4$, $D_5$ and $D_6$ having distances between one another which are smaller than the first predetermined distance are obtained from the vehicle $V_2$, and when a single data $D_7$ is obtained from the vehicle $V_3$, these data $D_1$, $D_2$ and $D_7$ are enclosed in independent blocks, and the data D to D are collected in a single block as shown at the right side in FIG. 3. Block labels 1, 2, 3 and 4 are assigned to the blocks, respectively.

At step S2, the calculation of relative speeds of the block data relative to the subject vehicle is carried out. More specifically, a predicted range of movement is determined from the last values of the block data, and the same labels are assigned to the blocks having current values of block data which are located within the predicted range of movement. Then, the relative speeds of the blocks relative to the subject vehicle are calculated based on the last and current values of the block data having the same block labels assigned thereto.

Figure 4:
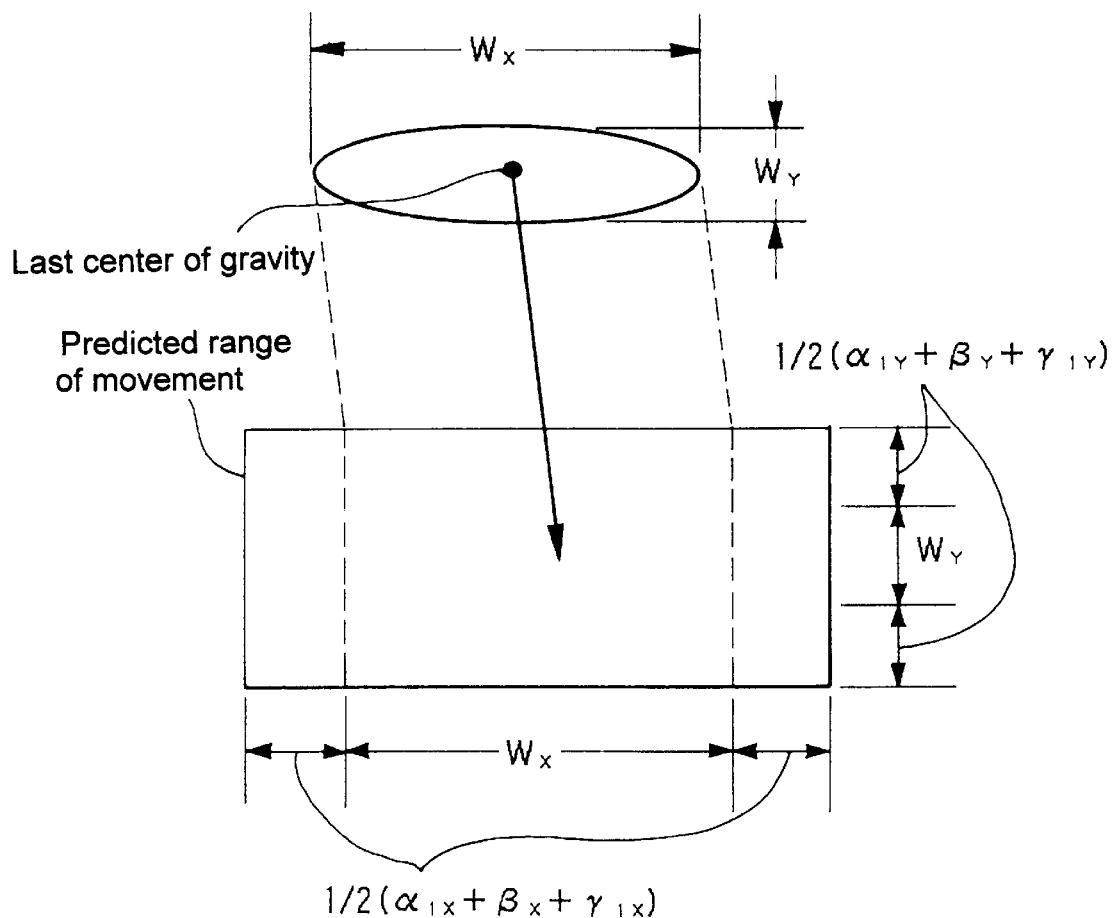
FIG. 4 is a diagram for explaining a method for determining a predicted range of movement when a last data has a relative speed.

The predicted range of movement is determined separately for a block having a previous relative speed, and for a block having no previous relative speed because the block is new from the last calculation time. Specifically, when the block has relative speed, the predicted range of longitudinal and lateral movements is determined as having a size of {(a range in which the position of the center of gravity of the block is movable up to a next measuring period+an error of a predicted value due to a variability in relative speed vector+an error of detection by the distance sensor+a block width measured last time/2)×2}. In FIG. 4, the range in which the position of the center of gravity of the block is movable up to a next measuring period is represented by $\alpha_1$, the error of the predicted value, due to the variability in a relative speed vector, is represented by $\beta$, the error of detection by the distance sensor is represented by $\gamma_1$, the width is represented by W, longitudinal (Y-axial) components of $\alpha_1$, $\beta$, $\gamma_1$ and W are shown with a suffix "Y" assigned thereto, and lateral components (X-axial) of $\alpha_1$, $\beta$, $\gamma_1$ and W are shown with a suffix "X" assigned thereto. The predicted range of movement is defined as shown in FIG. 4.

Figure 5:
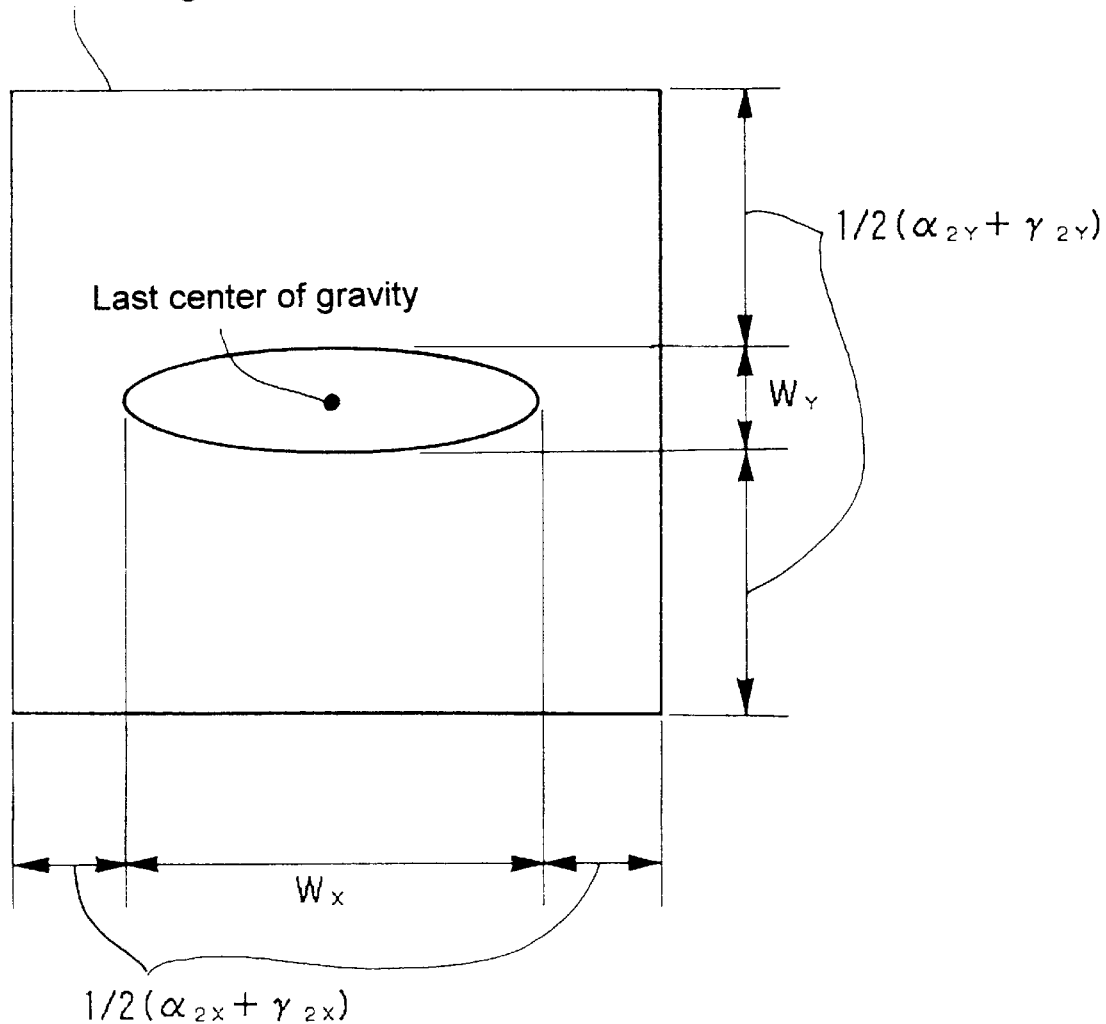
FIG. 5 is a diagram for explaining a method for determining a predicted range of movements when a last data has no relative speed.

When the block has no relative speed, the predicted range of movement is defined such that the position of the center of gravity of the last block is centered as shown in FIG. 5. That is, the predicted range of longitudinal and lateral movements is determined as having a size of {(a range in which the position of the center of gravity of the block is movable up to a next measuring period+an error of detection by the distance sensor+a block width measured last time/2) ×2}. In FIG. 5, the range in which the position of the center of gravity of the block is movable up to a next measuring period is represented by $\alpha_2$, the error of detection by the distance sensor is represented by $\gamma_2$, longitudinal components of $\alpha_2$, $\gamma_2$ and W are shown with a suffix "Y" assigned thereto and lateral components of $\alpha_2$, $\gamma_2$ and W are shown with a suffix "X" assigned thereto. The predicted range of movement is defined as shown in FIG. 5.

When the block has relative speed, the range in which the position of the center of gravity of the block is longitudinally movable up to the next measuring period, can be determined by calculating the speed of the block by a sum of the vehicle speed and the relative speed. When the block has no relative speed, such a range can be determined based on a speed at which the vehicle can travel on an actual road (e.g., 0 to 100 km/hr on a road in Japan). For example, when the measuring period is 0.1 second, a distance, through which the block of 0 km/hr is moved for the measuring period when the speed of the subject vehicle is 100 km/hr, is about 2.8 m in a direction toward the subject vehicle, as shown in FIG. 6A. A distance, through which the block of 100 km/hr is moved for the measuring period when the speed of the subject vehicle is 0 km/hr, is about 2.8 m in a direction away from the subject vehicle, as shown in FIG. 6B. Thus, the predicted range of longitudinal movement, depending on the speed of the subject vehicle, can be determined as shown in FIG. 6C by adding distance errors determined in directions toward and away from the subject vehicle to the value "2.8 m".

Then, for determining whether current block data exists within the predicted range of movement, the following processing is carried out.

Figure 7A:
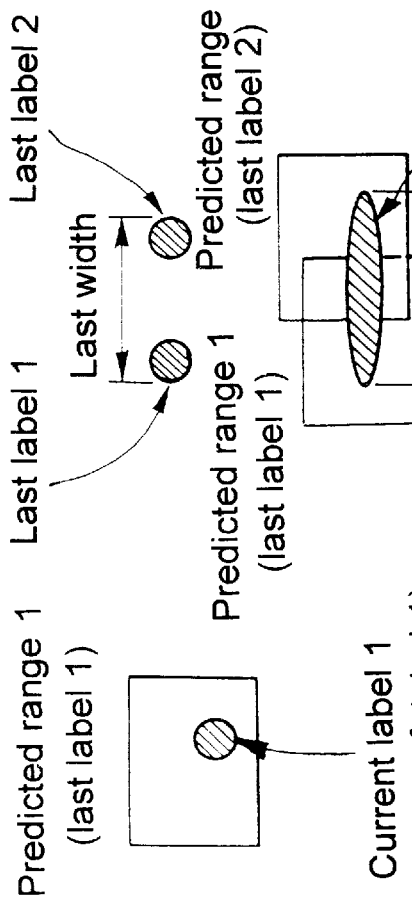
FIGS. 7A to 7C are diagrams for explaining how to enclose the data into blocks when a single current data exists within the predicted range of movements.

First, as shown in FIG. 7A, when there is only one current block data existing within an independent predicted range of movement, the last block label is taken over as it is, and the relative speed of the block relative to the subject vehicle is calculated according to the following equations:

$V_X$ = (the current center of gravity position in the X-direction - the last center of gravity position in the X-direction)/the measuring period
$V_Y$ = (the current center of gravity position in the Y-direction - the last center of gravity position in the Y-direction)/the measuring period wherein $V_X$ is the lateral relative speed, and $V_Y$ is the longitudinal relative speed.

Figure 7B:
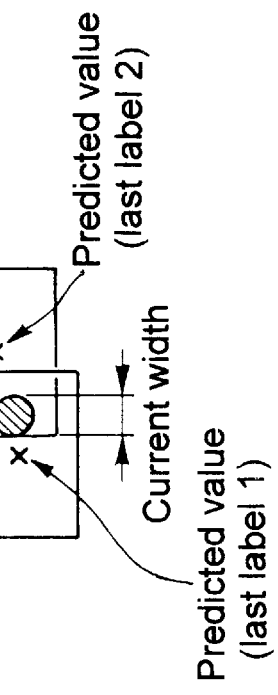

In a condition in which a current block exists within a plurality of predicted ranges of movement which superpose on one another, and when the width of the current block, and the width between left and right end points of a last block data having the same block label as the block label in the predicted ranges of movement within which the current block exists, as shown in FIG. 7B, are approximate values, it is determined that a plurality of last blocks have been coupled into one block, whereby one of the plurality of the block labels is defined as a current block label. The relative speed of the block relative to the subject vehicle is calculated according to the following equations:

$V_X$ = (the current center of gravity position in the X-direction - the last center position in the X-direction)/the measuring period
$V_Y$ = (the current center of gravity position in the Y-direction - the last center position in the Y-direction) /the measuring period wherein the last center position in the X-direction is (the left end point of a last label 1+the right end point of a last label 2)/2 in FIG. 7B, and the last center position in the Y-direction is (the Y center of gravity of the last label 1+the Y center of gravity of the last label 2)/2 in FIG. 7B.

Figure 7C:
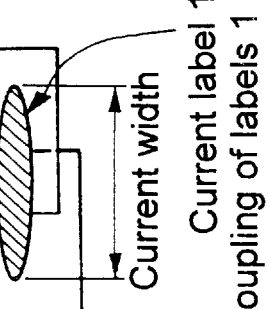

Further, as shown in FIG. 7C, in a condition in which a current block exists within a plurality of predicted ranges of movement which superpose on one another, and when the width of the current block, and the width between left and right end points of a last block data having the same block label as the block label in the predicted ranges of movement within which the current block exists, are approximate values, the block label of a predicted value closer to the current block, i.e., the label 1 in FIG. 7C is taken over, and the relative speed of the block relative to the subject vehicle in this case is calculated according to the following equations:

$V_X$ = (the current center of gravity position in the
X-direction - the iast center of gravity position in the
X-direction)/the measuring period
$V_Y$ = (the current center of gravity position in the
Y-direction - the last gravity center position in the
Y-direction)/the #easuring period Further, a plurality of current block data may exist in an independent predicted range of movements in some cases. In such a case, when the width of a last block, and the width of left and right end points of the plurality of current blocks are approximate values, as shown in FIG. 8A, it is determined that the last block has been divided into a plurality of blocks, and the relative speed of the block relative to the subject vehicle in this case is calculated according to the following equations:

$V_X$ = (the current center position in the X-direction -
the last center of gravity position in the
X-direction)Ithe iueasuring period
$V_Y$ = (the current center position in the Y-direction -
the last center of gravity position in the
Y-direction)/the measuring period wherein the current center position in the X-direction is (the left end point of the current label 1+the right end point of the current label 2)/2 in FIG. 8A, and the current center position in the Y-direction is (the center of gravity position of the current label 1 in the Y-direction+the center of gravity position of the current label 2 in the Y-direction)/2 in FIG. 8A.

Figure 9A:
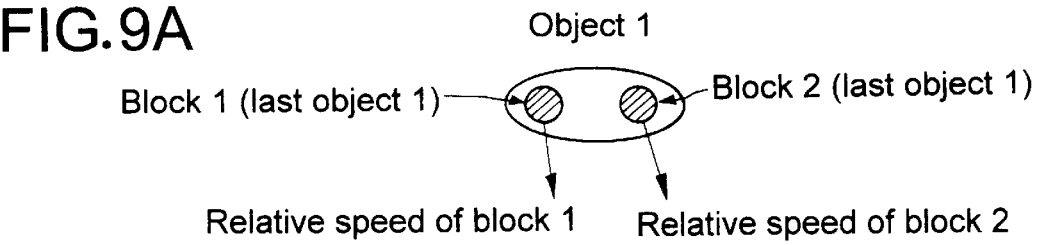
FIGS. 9A to 9C are diagrams for explaining the making of object data from block data.
Figure 9B:
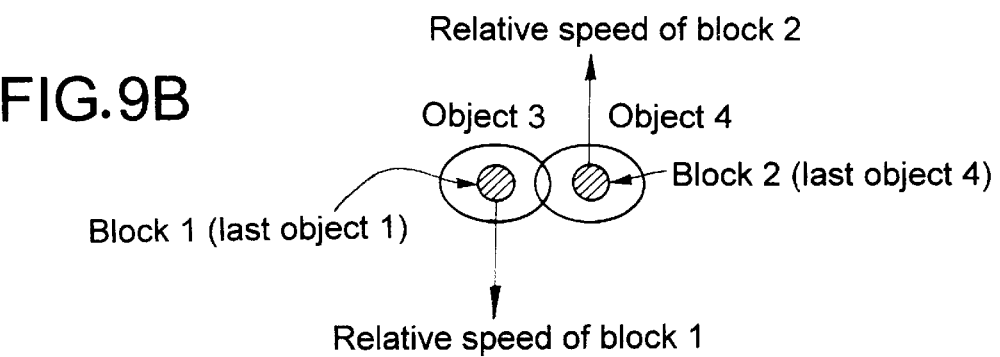
Figure 9C:
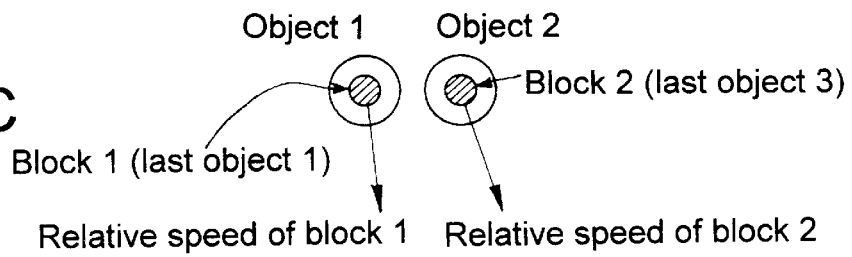

When a plurality of current block data exist in an independent predicted range of movements, but the width of the last block, and the width between the left and right end points of the plurality of current blocks are not approximate values, as shown in FIG. 8B, the block closer to a predicted value takes over the block label of the predicted value, i.e., the label 1 in FIG. 8B, and new block labels are assigned to the other blocks. The relative speed of the block relative to the subject vehicle in this case is calculated according to the following equations:

$V_X$ = (the current center of gravity position in the
X-direction - the last center of gravity position in the
X-direction)/the measuring period
$V_Y$ = (the current center of gravity position in the
Y-direction - the last center of gravity position in the
Y-direction)/the measuring period Referring again to FIG. 2, at step S3, an object data making or determining process is carried out for determining object data by determining whether a plurality of blocks provided by the enclosing process are the same object. More specifically, among of the plurality of blocks, those which exist within a second predetermined distance and whose relative speeds relative to the subject vehicle are within a preset value, i.e., the blocks which move in the same manner in positions adjacent with each other, are determined as the same object and collected together in one group. Here, the second predetermined distance is set, for example, as a value obtained by adding a detection error to a distance between left and right reflectors mounted on an actual vehicle. As shown in FIG. 9A, when the relative speeds of blocks 1 and 2, existing in the vicinity of each other, have approximate equal values, both the blocks 1 and 2 are collected, for example, in a group having an object label 1 assigned thereto. Further, as shown in FIG. 9B, when blocks 1 and 2, existing in the vicinity of each other, have largely different relative speeds, different object labels, e.g., 3 and 4, are assigned to the blocks 1 and 2, and these blocks are divided into groups independent from each other. Thus, object data is determined. Furthermore, as shown in FIG. 9C, when the blocks 1 and 2, which were not collected into one block in the last processing, come closer to each other and, which have approximate relative speeds, these blocks are not collected in the same group.

An X coordinate $C_X$ and a Y coordinate $C_Y$ of the center of gravity position of each object data are determined according to the following equations:

$C_X$ = (the left end point of each detection data in the
object data + the right end point thereof)/2
$C_Y$ = an average value of centers of gravity in the
direction of Y-axis of block data in the object data At step S4 in FIG. 2, an object relative-speed calculation is carried out. A relative speed $V_Y'$ of the object in the longitudinal direction (in the direction of Y-axis) and a relative speed $V_X'$ of the object in the lateral direction (in the direction of X-axis) are calculated according to the following equations:

$V_Y'$ = an average value of relative speeds $V_Y$ of the
blocks in the object data in the direction of Y-axis
$V_X'$ = an average value of relative speeds $V_X$ of the
blocks in the object data in the direction of X-axis The operation of the embodiment will be described below. The detection data obtained in the distance sensor 1 are varied, even if they are the same object, depending upon variations in distance to the object, in area against which the signal is applied and in reflectivity. However, by collecting, in the block having the block label assigned thereto, some of the detection data detected by the distance sensor 1 which exist within the first predetermined distance, it is possible to absorb the variations in distance between the object and the subject vehicle and variations in state of the object to stably provide the object data.

Moreover, since the object data are made by grouping based on the relative speed of each block relative to the subject vehicle and the relative distance between the blocks, it is possible to correctly recognize the objects whose relative motions relative to the subject vehicle are different. For example, when a four-wheel vehicle is traveling in proximity to a guard rail ahead of the subject vehicle, the four-wheel vehicle and the guard rail can distinctly be discerned and recognized, leading to a correct discrimination between the objects.

In order to obtain a relative speed of the object, particularly, a lateral relative speed, an average value of relative speeds of the blocks within the object data is defined as a relative speed of the object relative to the subject vehicle. Therefore, even if the block data are not stably obtained, and the center of gravity positions of the object data are varied laterally, a variability in relative speed cannot be produced.

Here, when the object data is varied at the second-to-last time, the last time and the current time (this time), the comparison between the case where the relative speed of the object is obtained according to the present invention and the case where the relative speed is obtained according to a time series change in gravity center position of the object data, is as shown in the following Table:

|  | Time series change in gravity center position | Average value of relative speeds | Difference between both method |
|---|---|---|---|
| Last relative speed in direction of X-axis | 0.1 | 0.1 | absent |
| Last relative speed in direction of Y-axis | −0.9 | −0.9 | absent |
| Current relative speed in direction of x-axis | 0.5 | 0.0 | present (0.5) |
| Current relative speed in direction of Y-axis | −1.0 | −1.0 | absent |

The relative speed according to the time series change in center of gravity position is calculated according to the following equation:

{(center of gravity last time − center of gravity second-to-last time) /measuring period}.

As apparent from the above Table, a difference cannot be produced between both of the methods with respect to the last relative speed in the direction of X-axis, the last relative speed in the direction of Y-axis and the current relative speed in the direction of Y-axis, but a difference is produced between both of the methods with respect to the current relative speed in the direction of X-axis due to the fact that the block data 1 has not been currently obtained (this time). Even if the object is advancing straight, it cannot be misjudged that the object has laterally moved suddenly, due to the fact that block data is not stably obtained. Therefore, the lateral relative speed of the object can be obtained with a good accuracy.

Although the embodiment of the present invention has been described in detail, it will be understood that the present invention is not limited to the above-described embodiment, and various modifications in design may be made without departing from the spirit and scope of the invention defined in claims.

What is claimed is:

1. A process for detecting an object in a vehicle which includes a distance sensor capable of detecting longitudinal and lateral distances from the subject vehicle to an object by transmitting a signal to the object and receiving the reflected signal from the object, said process comprising the steps of:

enclosing, into a block having a block label assigned thereto, some of the detection data detected by said distance sensor which exist within a first predetermined distance from one another;

comparing last and current values of a center of gravity position of each block with each other for every same block label to calculate a relative speed of each block relative to the subject vehicle;

determining object data by determining that some of the blocks which exist within a second predetermined distance and a difference between said relative speeds of which is within a preset value, are the same object; and averaging lateral relative speeds of the blocks in the same object to provide a lateral relative speed of the object relative to the subject vehicle.

2. A process according to claim 1, wherein said first predetermined distance is based upon an error of detection by the distance sensor and a size of a reflector mounted on the vehicle.

3. A process according to claim 1, wherein said comparison of last and current values includes predicting a range of movement from the last values of block data.

4. A process according to claim 3, wherein a predicted range of movement for a last block of data is determined separately for a) a block of data having a previous relative speed and b) a block of data having no previous relative speed.

5. A process according to claim 4, wherein a predicted range of longitudinal and lateral movements for the block having the previous relative speed is determined to have a size of {(a range in which a position of a center of gravity of the block is movable up to a next measuring period+an error of a predicted value due to a variability in relative speed vector+an error of detection by the distance sensor+a block width measured last time/2)×2}.

6. A processing according to claim 4, wherein a predicted range of longitudinal and lateral movements for the block having no previous relative speed is determined to have a size of {(a range in which a position of a center of gravity of the block is movable up to a next measuring period+an error of detection by the distance sensor+a block width measured last time/2)×2}.

7. A process according to claim 5, wherein the range in which the position of the center of gravity is movable is based upon a sum of vehicle speed and relative speed.

8. A process according to claim 6, wherein the range in which the position of the center of gravity is movable is based upon a speed at which the vehicle can travel on a road.

9. A process according to claim 3, further comprising the step of determining whether a current block data exists within a predicted range of movement.

10. A process according to claim 1, wherein the relative speed is calculated by $V_X$ = (a current center of gravity position in an X-direction − a last center of gravity position in the $$V_Y = \text{(a current center of gravity position in a Y-direction - a last center of gravity position in the Y-direction)/measuring period}$$

wherein $V_X$ is a lateral relative speed, and $V_Y$ is a longitudinal relative speed.

11. A process according to claim 1, wherein said second predetermined distance is based upon a detection error and a distance between left and right reflectors mounted on a vehicle.

12. A process according to claim 11, wherein a center of gravity position of each object data is determined by $$C_X = \text{(a left end point of each detection data + a right end point thereof)/2}$$
$$C_Y = \text{an average value of centers of gravity in the direction of Y-axis of block data, when } C_X \text{ is the X coordinate and } C_Y \text{ is the Y coordinate.}$$

13. A process according to claim 1, wherein an object relative speed in the longitudinal and lateral directions ($V_y'$ and $V_x'$) are determined by $$V_{Y}' = \text{an average value of relative speeds of the blocks in the object data in the direction of Y-axis}$$
$$V_{X}' = \text{an average value of relative speeds of the blocks in the object data in the direction of X-axis.}$$

14. A process according to claim 13, wherein a relative speed according to a time series change in center of gravity position is determined by $$\{\text{(center of gravity last time - center of gravity second-to-last time)/measuring period}\}.$$

* * * * *